United States Patent Office 2,892,813
Patented June 30, 1959

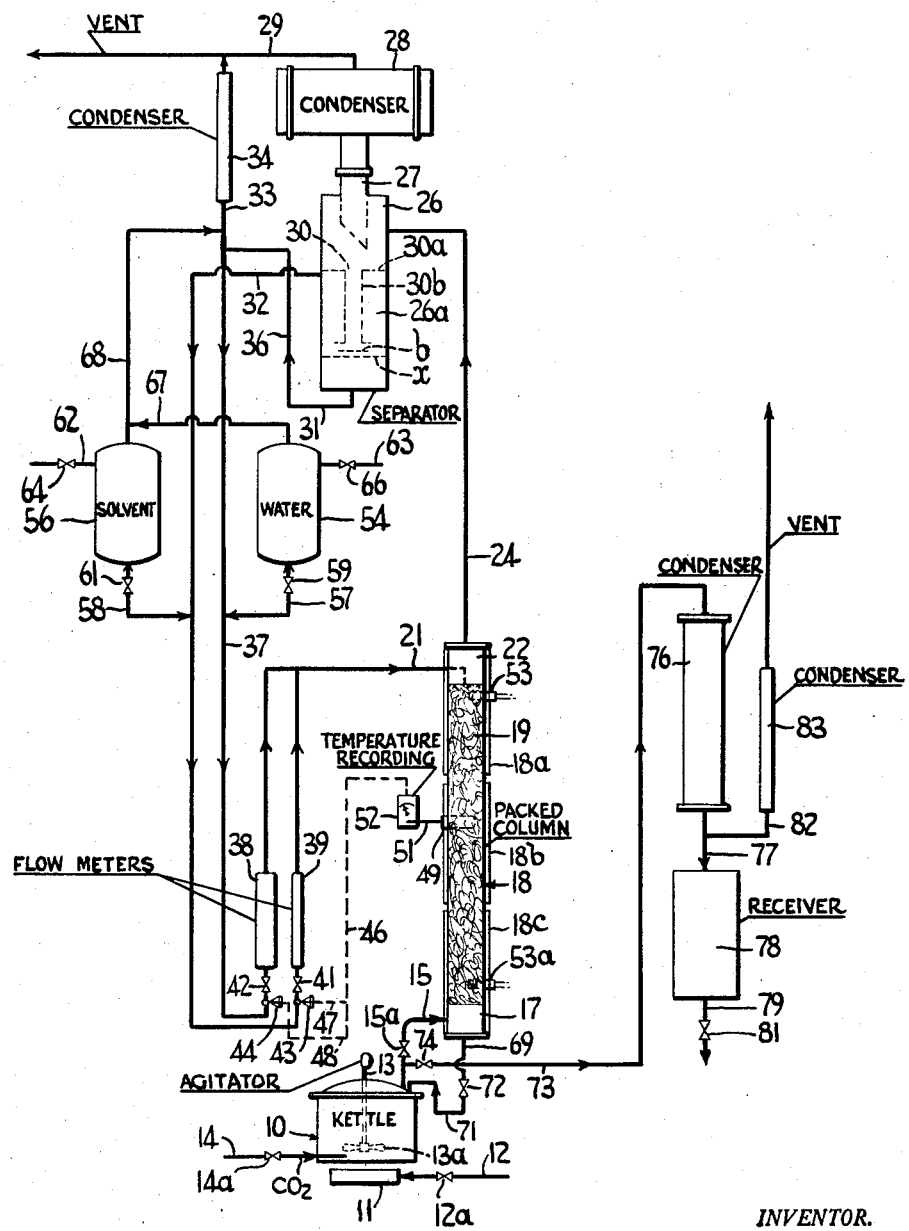

2,892,813

CONSERVATION OF DIHYDRIC ALCOHOL IN THE PREPARATION OF POLYESTERS BY APPLICATION OF WATER TO THE VAPORS FROM THE REACTION

Carl C. Georgian, La Marque, Tex., and Robert A. Wavering, Milwaukee, Wis., assignors to Pittsburgh Plate Glass Company Application March 23, 1954, Serial No. 418,140

18 Claims. (Cl. 260—75)

This invention relates to the preparation of polyesters of dihydric alcohols and polybasic acids and it has particular relation to a method of and apparatus for preparing such polyesters in which evaporational losses of the dihydric alcohol component are substantially eliminated or greatly reduced.

In the preparation of polyesters of dihydric alcohols such as trimethylene glycol, or propylene glycol and alpha-beta ethylenically unsaturated dibasic acids such as maleic acid (or its anhydride), or fumaric acid, or mixtures of these acids, with dicarboxylic acids (or anhydrides thereof) free of ethylenic unsaturation, such as phthalic or adipic acid, the dihydric alcohol (or a mixture of dihydric alcohols) and the dibasic acid (or a mixture of the two types of dibasic acids) are heated to a relatively high temperature whereby to effect esterification reaction with accompanying evolution of and evaporation of water. Usually a non-reactive medium of low solubility in water, e.g., an aromatic hydrocarbon such as xylene, or toluene, or other medium designed to distill azeotropically with the water of reaction and thus to promote removal of the latter from the system, is also included. The vapor mixture is removed and condensed and the liquid components are separated from each other by decantation. The aqueous fraction is discarded and the medium is returned to the reaction zone.

It has been observed that in the operation of such system, the dihydric alcohol component of the esterifiable mixture is characterized by a substantial tendency to distill over with the water and the aromatic hydrocarbon so that some of it is lost through the separation of the water. In this way, large amounts of the dihydric alcohol component (as much as 10 or 15 percent by weight) were often lost from the system. If a satisfactory acid number, stability, curing rate and other properties were to be attained in the polyester, and if the mechanical properties of the ultimate interpolymer were to be maintained at a satisfactory level, it was often necessary to employ excesses of dihydric alcohol to compensate for these losses. This was especially true in those instances where a relatively volatile dihydric alcohol such as propylene glycol was employed.

This invention comprises a method of and apparatus for reducing such losses of dihydric alcohol in forming polyesters and in certain of its aspects, it comprises introducing a mixture of a dihydric alcohol and one or more polybasic acids, at least a part of which is alpha-beta ethylenic, together with a non-reactive diluent designed to distill azeotropically with water into a closed vessel. The latter reaction mixture in the vessel is then heated to esterification temperature, and the vapor mixture from the reaction is passed into a column which is maintained at a graduated temperature, with the exit end of the column at a temperature near the boiling point of the azeotropic mixture passing from the column. At this point, the vapors are washed with water, or with a mixture of water and an aromatic hydrocarbon or other suitable medium. By thus contacting the vapor mixture with water, the loss of the water soluble dihydric alcohol component is greatly reduced. Usually, the time for esterification can be shortened and concomitantly, the acid value and stability are good, often even better than those of materials containing polyesters prepared in conventional manner. At the same time, the properties, such as strength of the ultimate interpolymer derived from the polyesters, are substantially equal to, or often superior to those of corresponding interpolymers derived from conventionally prepared polyesters. This system can, also, be employed where a conventional gelation inhibitor is cooked into the polyester.

As a still further feature, the invention comprises maintaining an intermediate portion of the column at a temperature so selected as to obtain a high degree of stability in the operation of the system.

For a better understanding of the invention, reference may now be had to the acompanying drawing in which the single figure illustrates diagrammatically an appropriate embodiment of apparatus for use in the practice of the invention.

It will be appreciated that such pumps for promoting flow of fluids and such other devices as are required by local conditions, or by engineering practice may be added, and are omitted from the drawings as being obvious.

The apparatus as shown in the drawing, comprises an appropriate reaction vessel such as a closed kettle 10 which is heated by a convenient instrumentality such as a gas burner 11, supplied with fuel through a line 12, having a valve 12a, by means of which the supply of fuel may be regulated to obtain any desired temperature in the reaction mixture. Naturally, any other convenient heating instrumentality may be employed and may, for example, comprise electrical heating coils, or heat interchange means for circulating a fluid medium; e.g., heating jackets, or tubular coils in the kettle. The kettle should also be provided with a temperature determining device, such as a thermometer or a thermocouple (not shown), an agitator 13, with blades 13a and a source of supply (such as a line 14 having valve 14a) of inert gas such as carbon dioxide, or combustion gases, for blowing the polyester product. Preferably, the inlet of gas is disposed just below the blades of agitator 13 in order to assure thorough contact of the charge and the gas.

Vapor mixture comprising solvent, water of reaction and small amounts of the dihydric component of the reaction mixture is conducted from the top of the kettle 10 through a line 15 provided with a valve 15a and are discharged into the lower portion 17 of a column 18. The latter, preferably, is provided with a suitable packing or with conventional bubble plates. For purposes of illustration, a foraminous packing 19 of Berl saddles, Raschig rings, or the like is shown.

Column 18 may be provided with jacket sections 18a, 18b and 18c, through which a fluid medium such as steam or a liquid, may be circulated to assist in attaining desired temperature gradient in the column. Suitable lines (not shown) may be employed to maintain circulation of fluid to jacket sections. In many instances, the use of the jacket sections is not required. This is especially true if xylene or other medium designed to form a low boiling mixture with water is returned to the top of the column. In those instances where xylene or other medium designed to form an azeotropic mixture with water is not employed, it has been found preferable to operate with a flow of steam or other medium to top section 18a, and even to sections 18b and 18c of the jacket. This assists in driving over water vapor from the column while permitting return of water to the top of the column in an amount to prevent carrying over of an excessive amount of dihydric alcohol. The mixture of vapors in the top of the column is washed and cooled by a liquid medium, at least a part of which is water, and preferably some of which is reflux medium such as xylene, immiscible with, or but partly miscible with the water. This medium, in the form of a spray, may be introduced into the column through the inlet line indicated at 21. The conditions of operation of the column will be more fully elaborated upon hereinafter.

Vapors of xylene or other reflux medium and water, usually as an azeotropic mixture, together with possible minute traces of the dihydric alcohol component of the reaction mixture in the kettle 10, are drawn off from the upper portion 22 of the column through line 24, and are discharged into the upper portion of a chamber 26 and from the latter, are discharged upwardly through conduit 27 to a condenser chamber 28 having a vent to a zone of appropriate pressure such as the atmosphere as at 29. The pressure could also be subatmospheric to promote removal of vapors, if so desired.

The vapors of water and reflux medium are condensed in the chamber and the condensed liquids are returned through conduit 27 to chamber 26, where they flow downward through opening 30 in partition 30a and conduit 30b to separator chamber or decanter 26a. In this chamber, the liquids stratify into layers having an interface X, which preferably is at about the terminus of conduit 30b. A baffle b slightly below the end of conduit 30b, deflects the liquids horizontally, and aids stratification of the liquid phases. In most instances, the water collects in the bottom of the chamber 26a, while the liquid reflux medium, being insoluble in and lighter than water, collects in the upper layer. These layers are drawn off respectively through lines 31 and 32, the former of which is provided with a vertical leg 36 of a height designed to maintain a proper level of water in the decanter chamber. Line 31 also vents to a zone at appropriate pressure, such as the atmosphere, or a vacuum through line 33, condenser 34 and line 29 as previously described.

Condensate (water) from line 31 is returned through line 37 to line 21 and constitutes at least a part of the water used in washing the vapors in the top of the column 18. Likewise, reflux medium such as xylene, from the upper portions of the decanter 26a, passing out through line 32, is returned through the same inlet line 21 to the top of the column. The proportions of water and reflux medium so returning to the top of the column 19 are accurately controlled and measured by means of suitable valves and meters, the latter of which may be so-called "Rotameters," designated but diagrammatically in the drawings. One of these 38, measures the flow of water while the other 39, measures the flow of reflux medium. The valve system comprises manually controlled valves 41 and 42 disposed in lines 32 and 37 respectively, below meters 39 and 38. These valves constitute means whereby the return flow of water and solvent can be shut off completely if desired, or by which the rate of flow can be adjusted manually to meet operating conditions.

For purposes of illustration, the return lines 32 and 37 are also indicated as being provided with automatically operable control valves 43 and 44 which can be controlled thermostatically by conditions in the column 18 as for example, through a line 46 having branches as at 47 or 48 to the respective valves. The valves may be electrically or pneumatically operated and the lines 46, 47 and 48 may be electrical conductors, or they may be tubes designed for conducting actuating fluid for the valves. Control of the actuating current or fluid to the valves may be readily automatically attained by a thermocouple, or a bimetallic element disposed in a suitable well 49 in the column 18, and having a connection 51 with mechanism indicated at 52 which may combine the functions of recording the temperatures in the zone about the well in the column 18 and also of providing a relay for the fluid medium to the automatic valves 43 and 44. Since such valves and the controls thereof are well recognized pieces of apparatus, elaboration on their construction is not deemed necessary.

The well 49 may be disposed in substantially any desired position in the column 18 and by proper adjustment of the apparatus for a predetermined temperature, it can be made to control the flow of returning fluids to the top of the column to attain desired refluxing of substantially all of the dihydric alcohol component from the vapors in the upper portion 22 of the column. However, it has now been found, that for purposes of attaining maximum stability and ease of operation of the system, it is preferable to position the well in an intermediate portion of the column, for example, in or near the upper third portion thereof. Departures from this precise position are permissible, but it is preferred that the well be within the middle three-fourths of the packed portion of the column. The well could also be inserted, though apparently it would operate somewhat less efficiently, at the top of the packing. The apparatus would, however, be much more critical in its behavior. It will be manifest that the apparatus should be adjusted to maintain a predetermined temperature in the specific zone in the column in which the well 49 is inserted. This temperature can be so selected that when it is attained, the top of the column will be at, or near the preferred temperature, as for instance near, or slightly above the boiling point of a constant boiling mixture of water and xylene or other solvent. If the position in the column of the well is raised or lowered, adjustment must be made in order to reach the temperature normal to the zone, when the top of the column is at its proper temperature.

Any desired number of additional wells, such as top and bottom wells 53 and 53a, designed to maintain a close check on temperature conditions in the various portions of the column may be included in the apparatus. However, as shown in the drawings, the well 49 preferably constitutes the zone at which temperatures are determined for the control of the return flow of the liquids to the top of the column. It is to be understood that the connections between the recording and relay device 52 and the valves 43 and 44 constitute refinements and are optional. The device 52, if preferred, may constitute a mere recorder for the temperature in the zone of the well 49, in which case the valves 43 and 44, or 41 and 42, are adjusted manually by an operator after due observation of the temperatures recorded by the device 52.

The amount of water passing out of kettle 10 as vapor, when condensed and returned as reflux, is not usually adequate to obviate, or to reduce to a minimum, loss of dihydric alcohol. Also, it will be manifest that the amounts of reflux medium and water available for washing the vapors and controlling the temperature in the top zones of the column 18 are often subjected to substantial variation and this is especially true of the water of reaction, since the latter increases to a maximum as the rate of reaction of esterification in the kettle 10 rises as the temperature rises; but as the reaction nears completion, the amount of evolved water obviously decreases, ultimately nearly to the vanishing point. To compensate for these variations, reserve tanks 54 and 56 are provided respectively for the water and reflux medium. The tank 54 functions to collect a reserve supply of water condensate which is used over and over to cool the top of column 18. The tanks are connected by lines 57 and 58 respectively to return lines 37 and 32 so that flow of liquids may be either to, or from the tanks, dependent upon the requirements for cooling and washing liquids for the top of said column. It will be obvious that the flow of liquids in the lines 57 and 58 may be hydrostatic and is away from the tanks when the supply of reflux liquid from the separator or decanter 26 is insufficient. On the other hand, when the latter source of supply becomes more than adequate to meet the requirements of the column, liquids can back up and flow toward the tanks, where they can be stored until required. Valves 59 and 61 provided in the lines 57 and 58, constitute means whereby the flow of liquids to, or from the tanks may be stopped, or adjusted at will. The tanks are also provided with lines 62 and 63 having valves 64 and 66 by means of which the supply of liquids can be replenished, or in event that they become excessive, a portion thereof can be discharged from the tanks at will. Desired operating pressures (which are usually atmospheric, but may be sub-atmospheric or super-atmospheric) in the tops of the tanks may be maintained through lines 67 and 68, which are joined together and the latter of which is connected to vent line 33.

It will be observed that the column 18 is provided at its bottom with a return line 69 for the return to the reaction kettle 10 of xylene or other solvent medium as well as condensed glycol or other dihydric alcohols. U shaped bend 71 in the line 69 provides a liquid seal to prevent the upward passage of vapors through this line. The line is also provided with a valve 72 by means of which the flow of liquid can be stopped, if desired.

Since the packing in the column 18, at lower temperatures often offers considerable resistance to the flow of vapors and fixed gases like carbon dioxide, or combustion gases, it is preferable to provide the kettle with a blow-off system which can be used to bypass the gases from the column 18 at the conclusion of the reaction or at any other desired stage. Such blow-off system includes a line 73 having a valve 74 by means of which it can be opened or closed at will. Line 73 discharges into a condenser 76, by means of which vapors of liquids such as reflux medium or the like can be condensed out and passed through line 77 to a receiver 78 having a drainage line 79, with a valve 81. The condenser and the receiver are vented to the atmosphere or to other constant pressure zone, either sub-atmospheric, or super-atmospheric, by means of a line 82 having a condenser 83, designed to condense out and recover any valuable materials, such as residues of reflux medium or dihydric alcohol, which may be carried in the escaping gases.

In the operation of the apparatus illustrated in the drawings, it is customary to initiate the reaction while charges of water and reflux medium are in tanks 54 and 56, in order that there may be an abundance of these materials at all times, properly to cool the vapor mixture in the top of column 18 and to wash out any dihydric alcohol vapors in this zone.

The kettle 10 is provided with a charge suitable for the preparation of a polyester in accordance with the provisions of the present invention. This charge may comprise the common ingredients employed in such polyesters, for example, it may comprise an alpha-beta ethylenically unsaturated dicarboxylic acid such as maleic acid, fumaric acid, itaconic acid, or the like, singly or in combination with acids which are free of ethylenic unsaturation and being represented by phthalic acid, terephthalic acid, succinic acid, adipic acid, sebacic acid and azelaic acid, and halogen substituted derivatives. These latter acids are of the formula:

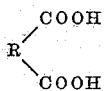

where R is hydrocarbon and contains from 2 to 10 carbon atoms. The usual dihydric alcohol components are ethylene glycol, propylene glycol, diethylene glycol, trimethylene glycol, butanediol-1,3, and butanediol-2,3. Of these several glycols, the propylene glycol is, at present, most commonly employed. Very high savings of this component can be effected by employment of the apparatus and techniques of the present invention.

Xylene or toluene are usually preferred as reflux media for the kettle, but others are within the scope of the invention. Examples of such other media include benzene, ethyl benzene, aromatic petroleum naphthas and other liquid media which will distill azeotropically with the water of reaction, at a temperature which preferably is below the boiling point of the mixture of the medium and the dihydric alcohol component. The medium should also be so selected as to obviate the formation of a ternary vapor mixture of dihydric alcohol, water and medium at the top of the column. An appropriate medium may also be described as being an organic distilling medium which is relatively insoluble in water but which possesses the property of forming with water vapors, volatile vapor mixtures which upon condensation, separate into an essentially aqueous fraction and an essentially nonaqueous fraction. Naturally, if other media than xylene are employed, adjustments of temperatures in the column 18 must be made to attain the approximate boiling point of the azeotropic mixture of water and medium in the top of the column. The media are employed in amounts sufficient to provide an adequate removal of water through reflux action between kettle 10 and the condenser system. An excess is permissible, but the amount may be relatively small, since the same material is refluxed over and over during the course of the reaction.

Small stabilizing amounts of a phenolic inhibitor of gelation such as hydroquinone may also be included in the reaction charge for purposes of cooking the same into the polyester. However, this component is not essential to the esterification reaction and may be eliminated, or if desired, may be added to the interpolymerizable mixture in a subsequent stage.

A charge in the kettle 10 is heated up in conventional manner until reaction with exothermic rise in temperature is initiated. It is then allowed to proceed without application of external heat until the evolution of heat subsides. During this stage, partial esterification occurs and when this stage is completed, the heat may again be turned on and the batch is allowed to attain reflux temperature, that is, the temperature at which vapors from the reaction mixture pass upwardly through column 18 and are subsequently condensed and separated and the reflux medium is returned to the reaction zone. The vapor mixture comprising medium such as xylene, water and the dihydric alcohol travel up the packed column 18. Assuming that xylene is used azeotropically to remove the water of reaction, the mid portion of the column approaches a temperature of about 198° F. to 250° F. and the top approaches about 198° F. to 203° F. At this point, a return flow of water and hydrocarbon reflux medium from the tanks 54 and 56 is initiated. This flow is preferably adjusted to maintain the temperature at about 210° F. to 235° F. in the mid-zone (which is the zone of well 49). It has been found that when this temperature is maintained in this zone, the temperature at the top of the packed zone of the column is maintained quite closely within the preferred range of 198° F. to 203° F., which is very close to the boiling temperature of the azeotropic mixture of xylene and water vapors.

Customarily, the flow of water and xylene are maintained in the ratios of about 1 to 4 with respect to each other. However, substantial departure from these proportions are within the scope of the invention. For example, the proportion of water may be lowered until the ratios are 1 to 8 or thereabouts, and still some of the advantages attending the use of application of a mixture of water and xylene as a cooling medium to the top of the column are maintained. On the other hand, the proportion of water can be increased, for example, to a ratio of 1 to 2 in parts by volume.

It will be recognized that in order to attain the necessary proportions of water in the cooling zone at the top of the column, substantial proportions of water from an external source, or from previously accumulated condensate, may often be required. This is especially true in the final stages of the reaction in which the evolution of water from the reaction zone may be quite slow. The amounts of total reflux, of course, are dependent upon the temperature desired in the upper zones of the column and are adjusted to maintain this temperature, as determined by a temperature measuring device in well 49, without regard to quantities as determined by volume or weight. It is desirable that the lower portion of the column 18 be maintained at a temperature to prevent any return of water to the kettle 10 and thus to cool the reaction mixture to an undesirable degree. A temperature of about 280° F. or 285° F. in the base zones of the column appears to be near the optimum when the dihydric alcohol component is propylene glycol and xylene is the reflux medium. This temperature is above the boiling point of water, so that the latter is completely, or in large measure excluded from return to the kettle. On the other hand, xylene or similar high-boiling media is permitted to return for subsequent recycling to the reaction zone. Naturally, some degree of variation in the temperature in the lower portion of the column is permissible, for example, 10° F. to 20° F. from the optimum above given. The liquid temperature in the reaction kettle preferably is approximately 190° C. to 200° C. (374° F. to 392° F.), but some degree of variation from this temperature, either up or down, dependent upon the reflux medium in the kettle or its azeotropes with water, is permissible. A range of 230° F. to 410° F. will meet most requirements.

In the operation of the apparatus with a suitable return of water and reflux medium such as xylene to the top of the column 18, it will be appreciated that the dihydric alcohol component is almost completely swept out of the vapors and returned through the column to the reaction kettle. The vapors passing out at the top of the column are almost completely water and xylene. This mixture of vapors passes up the line 24 to the chamber 26 and the condenser 28 where they are condensed and then dropped back into the separator chamber 26a. In the latter, they stratify and return to the column at the zone 22, along with such make-up water and xylene as may be required from the tanks 54 or 56. In some instances, it would appear that the water from kettle 10 when added to the water circulating as a cooling medium between the top of column 18 and chamber 26a, will exceed the requirements; an excess of water and xylene will then be built up in the system and will flow in reverse direction into the tanks 54 and 56.

The conclusion of the reaction in the kettle 10 is evidenced by the slowing up of the evolution of water, the increase of viscosity of the polyester product in the kettle and the dropping of the acid value, for example, to a range of about 40 to 60. The application of heat is then discontinued and carbon dioxide, or other inert gas is introduced into the bottom of the kettle, where it is dispersed by the agitator 13. At the same time, the valve 15a of the line 15 to the column 18 and the valve 72 of line 69 are closed, while the valve 74 of the blow-off line 73, is opened. The inert gas, in passing through the reaction product and out through the line 73, sweeps out residual water, reflux medium (e.g., xylene) and other products. Most of the liquifiable compounds condense out in the condenser 76 and are discharged to the receiver 78 while the gases pass up through the condenser 83 where any residues of any condensable material are removed and any fixed gas is then discharged through the vent line to the atmosphere or to an appropriate recovery apparatus.

Stripping of the polyester product in kettle 10 by blowing with gas, has been described. Vacuum applied after reaction may be applied to assist, or as a substiute for blowing. The polyester product while warm and fluid, is discharged for addition of styrene or other monomer.

Specific applications of the principles of the invention to the preparation of polyester compositions in accordance with the provisions of the present invention are illustrated by the following examples:

EXAMPLE I

This example illustrates the preparation of a polyester of propylene glycol and equal moles of maleic anhydride and phthalic anhydride. In conventional procedure, where the vapor mixture from the reaction kettle is passed directly to a condenser and separator for recovery of reflux medium, it is customary to employ 2.2 moles of propylene glycol, 1 mole of maleic acid and 1 mole of phthalic acid in the preparation of this polyester. The excess of propylene glycol is 10 percent based upon the stoichiometric ratio. This excess is necessary in order to attain a satisfactory acid number (about 40 to 50) adequate stability (about 10 days at 150° F.) in the interpolymerizable mixtures and adequate strengths in the ultimate products. In order to attain a satisfactory product by such techniques it has also been found desirable to conduct the reaction relatively slowly in order to reduce glycol losses, and to obtain a uniform product.

In the preparation of the polyester in accordance with the provisions of the present invention, the apparatus previously described was used; the apparatus was of stainless steel, the column 18 was of 4 inch internal diameter, with a 6 foot section packed with ½ inch Berl saddles. It also included clearing sections at the top and bottom. Jacket sections 18a, 18b and 18c were not used. A series of four runs were conducted, in which, polyester product was prepared. The steps were typical of those hereinafter employed, but with such minor differences as are specifically pointed out in the examples.

*Run 1*

In this run, propylene glycol was employed in stoichiometric amount with respect to the total of the two dicarboxylic acids; the total charge was about 70 to 80 pounds. Xylene was added in a ratio of about 8 to 9 percent by weight based upon the total mixture and the apparatus may be operated approximately to maintain this proportion.

The charge was warmed up in the kettle 10 in the manner previously described. Water and xylene in the respective amounts of about 15 and 60 milliliters per minute (1 to 4 ratio with respect to each other) were employed in the top of column 18 to prevent loss of propylene glycol. Approximately 4.2 hours was required for the initial exothermic rise, or warm-up. The contents of the kettle were heated to approximately 385° F. A vapor mixture comprising water, xylene and propylene glycol traveled up the column 18 and when the temperature of the mid-portion of the column at the well 49 approached 210° F., a flow of water and xylene from tanks 54 and 56, in the respective proportions of 1 to 4, was started into the top at 22 and was adjusted to maintain the temperature in the mid-zone at 210° F. to 235° F. while the temperature at the top of the column was at 198° F. to 203° F. and the temperature at the bottom was about 280° F., which is somewhat below the boiling point of xylene. The propylene glycol was completely, or almost completely condensed out from the vapors escaping from the top of the column and was returned to the reaction zone. A constant boiling mixture of water and xylene vapors escaped from the top of the column and after condensation and separation, was returned, with the cooling mixture. The reaction was maintained under these conditions for about 6.3 hours. At the conclusion of the reaction, the product was blown in the kettle by a stream of combustion gases for 0.40 hour, at the end of which time, the acid value of the product had dropped to 46.3 and the viscosity, as determined as a 60 percent solution total solids in monomethyl ether of ethylene glycol at 77° F., was J on the Gardner-Holdt scale.

| Method | Polyester ||| Polyester and Styrene ||||
|---|---|---|---|---|---|---|---|
| | Excess propylene glycol (percent) | Acid No. | Time of Cook (Hrs.) | Oven Stability (Days at 150° F.) | L.P.E. value (min.) | Viscosity (Gardner-Holdt) | Minimum Cure (mins. at 110° C.) |
| Standard | 10 | 43 | 12-16 | 28 | 5.50 | T | 1½ |
| New Method | 3 | 43.2 | 9.6 | 32 | 4.90 | Q | 1½ |

The polyester product as thus obtained, was mixed with an appropriate inhibitor of gelation, namely about 0.15 percent by weight based upon the polyester of trimethylbenzyl ammonium chloride and the mixture while hot and fluid, was mixed with styrene to provide an interpolymerizable composition comprising about 2 parts by weight polyester and 1 part by weight styrene. The mixture when appropriately catalyzed with a suitable free radical initiator such as benzoyl peroxide in an amount of about 1 percent by weight, could be poured into molds and cured by heating it to a temperature of 90° C. to 100° C., and subsequently baking at 125° C. to 150° C. Likewise, the composition could be applied to fabrics and mats of glass fibers to provide panels suitable for use in airplane construction, boats and for numerous other applications.

*Run 2*

The interpolymerizable mixture in this instance, was the same as in Run 1 except that a 2 percent excess of propylene glycol was employed. The warm-up period was 3.3 hours. The mixture was subsequently refluxed for 5.2 hours with return of water and xylene to the top of the column to maintain desired temperatures in the several zones thereof. The product was blown for 0.40 hours with carbon dioxide in order to remove residual water, xylene and other volatile constituents. The acid number of this product, after blowing, was 43.0 and the viscosity was H.

Inhibitor was incorporated as in the preceding run and styrene in an amount of 33.7 percent by weight based upon the total mixture was added. This mixture was catalyzed with 1 percent by weight of benzoyl peroxide. Castings prepared from the mixture had a flexural strength of 19,920 pounds per square inch. The material, like that described in Run 1, could be employed in forming laminates which were suitable for use as panels in airplane construction, in the fabrication of boats and numerous other applications.

*Run 3*

This is a repetition of Run 1, except that 3 percent excess of propylene glycol was employed. The warm-up time in this instance was 4.0 hours. The mixture was refluxed with a return of water and xylene in a 1 to 4 ratio to the top of the column, for 5.3 hours, and was blown with combustion gas from burning a fuel gas in air for 0.30 hours in order to remove volatile constituents. The total time was 9.6 hours. The product had an acid value of 43.2 and a viscosity of H. When suitably stabilized with a gelation inhibitor, it was made up with styrene to a viscosity of Q. Castings of this mixture had a flexural strength of 18,800 pounds per square inch, and a heat distortion value of 101° C. This material is at least essentially the equivalent of or an improvement in properties upon the corresponding products obtained from alkyds or polyesters resulting from the interaction of the same acid mixture with a 10 percent excess of propylene glycol, but without column 18 and without washing the vapors from the reaction mixture with water.

Some of the important properties of this material as compared with a corresponding product prepared with a 10 percent excess of propylene glycol by standard techniques are tabulated as follows:

The L.P.E. (liquid-peak-exotherm) test in the table was conducted by the method outlined in Parker Patent 2,593,787, but with 1 percent of benzoyl peroxide as a catalyst. "Oven stability" represents the time in days for the uncatalyzed mixture to gel at 150° F. In order to determine minimum cure value, the liquid resin in question is catalyzed with 1 percent of benzoyl peroxide. The resin is then applied as a bond agent to a glass cloth laminate, and the laminate is cured at 110° F. The time in minutes required for laminate to attain a minimum Barcol reading of 40 is accepted as the minimum cure value.

It is to be observed that cures as indicated by L.P.E. and "minimum cure values" of the product prepared by the improved method are equal to or faster than for the conventionally prepared material, yet stability is even higher. A saving in propylene glycol of 7 percent, as compared with the product prepared by the conventional procedure is attained.

*Run 4*

This is essentially a repetition of Run 3, except that a small stabilizing amount of hydroquinone was added with the batch and was cooked into the latter during the reaction period. The resulting product could be incorporated with styrene, or other monomer as in the preceding examples to provide an interpolymerizable mixture useful as a binder in the preparation of laminates from fabrics and mats of fibrous materials such as glass, cotton or the like.

EXAMPLE II

This example illustrates the preparation of a polyester of propylene glycol and maleic acid without added saturated acid. In the preparation of the polyester in accordance with conventional procedure without the use of a column 18 and without a return feed of water and xylene to the column, it is customary to employ a 13 percent excess of propylene glycol in order to promote reaction and to compensate for losses during the reaction.

In accordance with the provisions of the present invention, a charge of maleic anhydride, propylene glycol (total about 70 pounds) and a small reflux amount of xylene was introduced into the kettle 10; the excess of propylene glycol was 8 percent. The mixture was then warmed up to initiate the reaction, as in the preceding example, and after the exothermic rise had ceased, the mixture was brought up to 385° F. and the column temperatures were adjusted without the use of jacket sections 18a, 18b and 18c, to the range (210° F.-235° F. in the mid-zone) previously described. A reflux of 1 part of water to 4 parts of xylene (respectively about 15 and 60 milliliters) was maintained at the top of the column in such amount as to attain and maintain the desired temperatures in the several zones of the column. At the conclusion of the reaction, the mixture was blown in the kettle with combustion gas in order to remove excess xylene, water and any other volatile constituents present. The time schedule of the reaction was 2.6 hours for the warm-up, 5.8 hours under reflux and 0.3 hours in blowing with carbon dioxide. The product had an acid value of 42.8 percent and a viscosity of I—.

To the warm polyester product was added gelation inhibitor as in conventional procedure and about 33 percent by weight (based upon the total mixture) of styrene was added to provide a liquid mixture which could be mixed with 1 percent of benzoyl peroxide, poured into molds and cured, or which could be spread upon, or impregnated into fabrics and mats of various fibrous materials such as glass, cotton or the like. When the mixtures were cured by heating in accordance with conventional schedules for such interpolymerizable mixtures, hard, tough and useful resin bodies were obtained. These materials are essentially the equivalent of the materials prepared in accordance with conventional procedure with 13 percent excess of propylene glycol. The saving in the latter constituent is about 5 percent. The interpolymerizable mixtures obtained from the polyesters prepared in accordance with the provisions of this example have substantially better stability than mixtures obtained by use of the corresponding polyesters resulting from inclusion of 13 percent excess propylene glycol.

Some of the properties as compared with a material prepared by standard techniques with a 13 percent excess of propylene glycol are tabulated as follows:

finally it was blown with inert gas for 2.1 hours. The product had an acid value of 40.7 and an alkyd viscosity of I—.

An interpolymerizable mixture was then prepared comprising:

| | Parts by weight |
|---|---|
| Polyester | 75 |
| Styrene | 25 |
| Trimethyl benzyl ammonium chloride | 0.1 |
| Quinone | 0.001 |
| Triphenyl phosphite (decolorizing agent) | 0.1 |

In order to test the material, 1 percent by weight, based upon the mixture of benzoyl peroxide, was added as a free radical initiator. The material was poured into molds and cured in conventional manner to provide a product which had a flexural strength of 20,280 pounds per square inch. This product was deemed to be equal to, or even better than the conventionally prepared product in which the polyester included the excess before mentioned, of propylene glycol and diethylene glycol.

A comparison between the material and a correspond-

| | Polyester | | | Polyester and Styrene | | | | |
|---|---|---|---|---|---|---|---|---|
| Method | Excess propylene glycol (percent) | Acid No. | Time of Cook (Hrs.) | Oven Stability (Days) | L.P.E. (Mins.) | Viscosity (Gardner-Holdt) | Min. cure (Mins. at 110° C.) | Heat Dist. Point, ° C. |
| Standard | 13 | 39.8 | | 13 | 4.30 | T | ½ | 193 |
| New Method | 8 | 42.8 | 8.7 | 24 | 3.00 | T | ½ | 200 |

The mixture containing the polyester prepared by the new method resists heat distortion substantially better ing material prepared by standard methods is presented as follows:

| | Polyester | | | Polyester and Monomer | | | |
|---|---|---|---|---|---|---|---|
| Method | Excess propylene glycol (percent) | Time of Cook (hrs.) | Oven Stability (Days) | L.P.E. (Mins.) | Flexural Strength (p.s.i.) | Viscosity (Centipoises) | Heat Distortion Point (° C.) |
| Standard | 2.0 | | 17 | 5.60 | 19,250 | 1,400 | 69 |
| New Method | 0.0 | 12.1 | 41 | 5.30 | 20,280 | 1,400 | 75 | than the material where the polyester is prepared by the standard method.

EXAMPLE III

This example illustrates the preparation of a polyester containing a mixture of glycols:

The polyester components were:

| | Moles |
|---|---|
| Maleic anhydride | 3.2 |
| Phthalic anhydride | 4.8 |
| Propylene glycol | 6.0 |
| Diethylene glycol | 2.0 |

In the conventional method of preparing this polyester without the use of a tower such as 18 for returning dihydric alcohol to the reaction zone, it is customary to employ a 0.12 mole excess of propylene glycol and a 0.04 mole excess of diethylene glycol. In accordance with this example, these excesses of dihydric alcohol were eliminated. In conducting the reaction, the mixture of maleic anhydride, phthalic anhydride, propylene glycol, diethylene glycol and a small reflux amount of xylene were introduced into the kettle 10. The mixture was warmed up in the manner previously described in the preceding examples over a period of 3 hours. It was then subjected to reflux with column 18 operating under the conditions previously described, for 7 hours and Manifestly, the foregoing apparatus and techniques of using the same might be employed in the preparation of substantially any of the conventional polyester products in which there is a tendency for the polyhydric alcohol component to pass over in the vapor mixture from the reaction vessel and to be lost in the water discharged from the reaction.

Substantial departure could be made in the operation of the apparatus and especially with respect to the techniques of supplying water to the top of the column 18. For example, it is not necessary to recover the water condensed and separated off in the decanter 26a. The latter, could, if desired, be discarded with but little loss of the dihydric alcohol component, since but very little finds its way from the column 18 to the decanter 26a.

It will be apparent that the position of the well 49 may be raised or lowered at will though, of course, consideration must be given to the proper selection, of a temperature appropriate for the specific portion of the column selected. It has been found that with the well disposed near the middle of the column, maximum stability of operation is attained. It will be apparent that the proportioning and rate of flow of the cooling liquids to the top of the column can be made manually, based upon mere observation of a temperature recording device in the column or the control can be made automatic by suitable connections such as the optional connection 46 between the recording device 52 and the control valves 43 and 44.

It is usually preferred to add water and xylene simultaneously at the top of column 18; with such system, losses of dihydric alcohol such as propylene glycol are reduced to a minimum. However, it will be understood that some improvement over conventional modes of procedure can be attained by use of water alone as the cooling and washing medium in the top of the column 18. Xylene from decanter 26a can be returned to the kettle 10 without passing through the column 18. The base of the column should be maintained at about 280° F.

The reaction may also be conducted without xylene or other reflux medium in kettle 10, but with a return flow of water to the top of the column to prevent, or reduce substantially complete loss of dihydric alcohol in vapor form from the latter. If the kettle 10 is operated without a solvent designed to form a low boiling azeotropic mixture with water, it will be found advisable to increase the temperature of the top of the column 18 to a value above the boiling point of water (212° F.) at atmospheric pressure in order to assist in removing water vapor. Removal of water may, however, be promoted by application of vacuum to reduce the boiling point, or by sweeping the kettle 10 and the column 18 with gas such as carbon dioxide or combustion gas, in order to obtain partial pressure effects. A combination of vacuum and sweeping may also be employed. In order to attain adequate temperature in the top of the column 18 without azeotrope-forming solvent in kettle 18, but with return of water through line 21, it is usually preferred to supply steam to jacket section 18a. The same may also be done for sections 18b and 18c. The operation of the system without xylene in the kettle is illustrated by the following example.

EXAMPLE IV

A charge of equal moles of maleic anhydride and phthalic anhydride and two moles plus a three percent excess of propylene glycol was introduced into the kettle 10. The total charge was about 70 pounds.

The charge was heated to evolve water and the mixture of water and propylene glycol vapors was passed up through the column 18. A return flow of water at a rate of about 15 milliliters per minute was initiated through line 21. Steam was supplied to the top of the jacket to maintain a temperature of 220° F. to 230° F. The mid-zone about well 49 was at a temperature of about 235° F. to 260° F. The bottom was at a temperature above 300° F. A flow of combustion gases to sweep out water of reaction from the mixture in kettle 10 was maintained during the reaction. Reaction was continued for 15¾ hours. The polyester product had an acid value of 46.3 and a viscosity of H—. The polyester was clear and suitable for mixing with styrene to form an interpolymerizable mixture which could be cast in molds, or spread on fabrics and cured to form a hard durable resin. The polyester was deemed to be the equivalent of that obtained without the use of column 18 on the kettle 10, but with a charge of equal moles of maleic anhydride and phthalic anhydride and a 15 percent excess of propylene glycol. The saving in glycol is about 12 percent based on the original charge.

EXAMPLE V

The charge in this instance, was:

| | Moles |
|---|---|
| Diethylene glycol | 7.18 |
| Adipic acid | 6.0 |
| Maleic anhydride | 1.0 |

A small amount of xylene was added to the charge and cooking was effected in the apparatus as already described. A return flow of water and xylene in 1 to 4 ratio to the top of the column 18 was maintained to keep the temperature at the top of the column in the range of 198° F. to 203° F. Cooking was continued for 17 hours, at the end of which time, the acid value was at standard. A saving of 2 to 3 hours in cooking time was thus attained. The product was comparable with that prepared by standard techniques without the column 18 between the kettle 10 and condenser 28.

In the examples other dihydric alcohols such as ethylene glycol, 2-3 butylene glycol, or trimethylene glycol may be substituted in whole or in part for propylene glycol. Maleic anhydride can be replaced partially or completely by fumaric acid, itaconic acid, or other alpha-beta ethylenic dicarboxylic acid; phthalic acid can be replaced by terephthalic acid, succinic acid, adipic acid, sebacic acid, azelaic acid or other acids free of ethylenic unsaturation or mixtures thereof. It is to be understood that the term "acid" includes the anhydride of the acid.

It will be apparent to those skilled in the art that the forms of the invention shown and described herein are by way of illustration only. Manifestly numerous modifications may be made therein without departure from the spirit of the invention or from the scope of the appended claims.

We claim:

1. A method of forming a polyester of propylene glycol and a dicarboxylic acid containing alpha-beta ethylenic unsaturation, which comprises heating a reaction mixture of xylene, propylene glycol and said acid, the acid being in approximately stoichiometric ratio with respect to the propylene glycol, whereby to drive off vapors of water of reaction and vapors of xylene, passing the vapors through a vertically elongated zone and washing the vapors in the top of the vertically elongated zone with a mixture of water and xylene to maintain the top of the vertically elongated zone at about the boiling point of the azeotropic mixture of xylene and water and to prevent the escape of vapors of propylene glycol carried in the vapor mixture the bottom portion of the zone being at a temperature to vaporize water tending to pass downwardly to the reaction mixture.

2. The method of claim 1, in which the water and the xylene in the top of the vertically elongated zone are respectively in the ratio of about 1 to 4 in parts by volume.

3. The method of claim 1, in which the water and xylene employed to wash the vapors in the top of the vertically elongated zone are in the respective proportions of about 1 to 4 parts by volume with respect to each other, and the bottom of the column is maintained at a temperature above the boiling point of water and below the boiling point of xylene.

4. The method of forming a polyester of maleic anhydride and propylene glycol, which comprises heating a reaction mixture of an approximately stoichiometric proportion of said anhydride and said glycol in the presence of xylene to effect esterification reaction and to drive off vapors of water of reaction and xylene as a mixture, passing the vapor mixture into a lower portion of a vertically elongated zone, adding water and xylene to the top of the vertically elongated zone to obtain a temperature within a range of about 198° F. to 203° F. at said top and to maintain the mid-portion of the vertically elongated zone at a temperature within the range of 198° F. to 250° F. the bottom portion of the zone being at a temperature to vaporize water tending to pass downwardly to the reaction mixture.

5. The method of preparing polyesters of propylene glycol and a mixture of an alpha-beta ethylenically unsaturated dicarboxylic acid and phthalic acid, comprising heating a reaction mixture of xylene, said glycol and said acid to a temperature of about 230° F. to 410° F. to evolve vapors of xylene, water and dihydric alcohol and to effect esterification reaction between the glycol and acid, passing the vapors through a vertically elongated zone and washing the vapors in the top of the vertically elongated zone with water in an amount substantially in excess of that evolved in the course of the esterification reaction in the kettle, whereby to maintain the vapor mixture in the top of the vertically elongated zone at a temperature approximating that of the boiling point of an azeotropic mixture of water and xylene the bottom portion of the zone being at a temperature to vaporize water tending to pass downwardly to the reaction mixture.

6. The method according to claim 5 in which the feed of water and xylene is controlled to obtain a temperature of 210° F. to 235° F. at the mid-portion of the vertically elongated zone.

7. A method of forming a polyester of a dihydric alcohol component and a dicarboxylic acid component, the dihydric alcohol component being from a class consisting of ethylene glycol, propylene glycol, diethylene glycol, trimethylene glycol, propylene glycol, butanediol-1,3 and butanediol-2,3, the dicarboxylic acid component being from a class consisting of maleic acid, fumaric acid and itaconic acid and mixtures thereof with acids of the class consisting of phthalic acid, terephthalic acid, succinic acid, adipic acid, sebacic acid, and azelaic acid said alcohol being volatile at esterification temperature; said method comprising the steps of heating a reaction mixture of said alcohol, said acid and an aromatic hydrocarbon which with the water, is an azeotrope-forming solvent, but at the boiling point of the azeotrope, does not form a ternary vapor mixture that includes the dihydric alcohol, said alcohol component and said dicarboxylic acid component being in approximately stoichiometric ratio with respect to each other, the temperature of heating being sufficient to esterify the mixture of the alcohol and the acid and to drive off vapors of hydrocarbon, water of reaction and said alcohol; passing the vapors into a lower portion of a vertically elongated zone, washing vapors in an upper portion of the zone with water in an amount to maintain said upper portion at about the boiling point of an azeotropic mixture of said hydrocarbon and water and withdrawing a mixture of said hydrocarbon and water from said upper portion and condensing the latter mixture, said lower portion of the zone being at a temperature to vaporize water tending to pass downwardly to the reaction mixture.

8. A method of forming a polyester of a dihydric alcohol component and a dicarboxylic acid component, the dihydric alcohol component being from a class consisting of ethylene glycol, propylene glycol, diethylene glycol, trimethylene glycol, butanediol-1,3 and butanediol-2,3, the dicarboxylic acid component being from a class consisting of maleic acid, fumaric acid and itaconic acid, and mixtures of one of said acids and an acid of a class consisting of phthalic acid, terephthalic acid, succinic acid, adipic acid, sebacic acid, and azelaic acid, which comprises heating to a temperature of about 230° to about 410° F., a mixture of said dihydric alcohol component and said dicarboxylic acid component and aromatic hydrocarbon which is relatively insoluble in water, which possess the property of forming an azeotropic mixture with water but at the temperature of azeotrope formation, with water forms vapor mixtures which upon condensation, separate into an essentially aqueous fraction and an essentially nonaqueous fraction, the alcohol and the acid being in approximately stoichiometric ratio with respect to each other whereby to drive off vapors of the aromatic hydrocarbon, water of reaction and said alcohol, passing the vapors into a lower portion of a vertically elongated vapor zone, washing the vapors in the top of the zone with a mixture of water and said aromatic hydrocarbon in approximately azeotropic ratio with respect to each other to maintain the top of the zone at about the boiling point of the azeotropic mixture of said hydrocarbon and water and withdrawing a mixture of vapors of said hydrocarbon and water from said top of the zone and condensing the latter mixture, the bottom portion of the zone being at a temperature to vaporize and return upwardly water tending to pass downwardly to the reaction mixture.

9. The method of claim 7 in which the dicarboxylic acid is fumaric.

10. The method of claim 8 in which the dicarboxylic acid is maleic acid.

11. The method of claim 7 in which the dicarboxylic acid component, in part, comprises maleic acid and in part comprises a phthalic acid.

12. The method of claim 4 in which the maleic anhydride is further mixed with a dicarboxylic acid which is free of ethylenic unsaturation, and is of a class consisting of phthalic acid, terephthalic acid, succinic acid, adipic acid, sebacic acid, and azelaic acid, said propylene glycol being stoichiometrically proportioned with respect to the sum of the two acids.

13. In the method of preparing a polyester from a dihydric alcohol component and a dicarboxylic acid component, the dihydric alcohol component being from a class consisting of ethylene glycol, propylene glycol, diethylene glycol, trimethylene glycol, butanediol-1,3 and butanediol-2,3, the dicarboxylic acid component being from a class consisting of maleic acid, fumaric acid and itaconic acid and mixtures thereof with an acid of the class consisting of phthalic acid, terephthalic acid, succinic acid, adipic acid, sebacic acid, and azelaic acid, the alcohol being volatile at esterification temperature; the steps of heating a reaction mixture of said alcohol and said acid with xylene as a reflux medium, to the temperature of esterification of said components whereby to obtain a mixture of vapors of xylene, water of reaction and said dihydric alcohol, passing the vapors into a lower portion of a vertically elongated vapor zone, and contacting the vapors in the upper portion of the zone with a mixture of water and xylene, withdrawing from the latter portion, a mixture of water and xylene vapors substantially free of said dihydric alcohol vapors and then condensing said mixture of water and xylene vapors, said lower portion of the zone being at a temperature to vaporize water tending to pass downwardly to the reaction mixture.

14. In a method of forming a polyester of a propylene glycol component and a dicarboxylic acid component, the latter component being of an alpha-beta ethylenically unsaturated dicarboxylic acid of a class consisting of maleic acid, fumaric acid, and itaconic acid and mixtures thereof with an acid of a group consisting of phthalic acid, terephthalic acid, succinic acid, adipic acid, sebacic acid, and azelaic acid; the steps of heating a reaction mixture of the propylene glycol and the dicarboxylic acid dissolved in xylene to a temperature of about 374° F. to 392° F. whereby to effect esterification thereof and to drive off a mixture of vapors consisting essentially of water, xylene and propylene glycol, passing the vapors into a lower portion of a vertically elongated zone while cooling the vapors in the bottom portion of the zone to a temperature of about 280° F. and while cooling vapors in the top portion of the zone to a temperature of about 198° F. to 203° F., drawing off an azeotropic mixture of vapors of water and xylene from the latter portion of the zone and maintaining a reflux of water as a phase in said latter portion of the zone while maintaining said temperature of about 198° F. to 203° F., the reflux being continued substantially throughout the esterification reaction, the bottom portion of the zone being at a temperature to vaporize water tending to pass downwardly to the reaction mixture.

15. In a method of preparing a polyester from a dihydric alcohol of a class consisting of ethylene glycol, propylene glycol, diethylene glycol, trimethylene glycol, butanediol-1,3 and butanediol-2,3 and dicarboxylic acid mixture consisting of adipic acid and an acid of the formula:

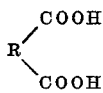

where R is an alpha-beta ethylenically unsaturated hydrocarbon radical, the alcohol being volatile at esterification temperature, the steps of heating a mixture of said alcohol and said acid dissolved in xylene, to the temperature of esterification to obtain a mixture of vapors of xylene, dihydric alcohol and water of reaction, passing the mixture into a lower portion of an elongated zone, the top of which is at about the boiling point of an azeotropic mixture of xylene and water and the bottom of which is below the boiling point of xylene and above the boiling point of the azeotropic mixture and washing the vapors in the top of the zone with a mixture of 1 part of water and 2 to 8 parts of xylene, said washing of the upper portion of the zone being continued substantially throughout the reaction of esterification.

16. The method of claim 15 in which the dihydric alcohol is propylene glycol.

17. A method of forming a polyester of a dihydric alcohol of a class consisting of ethylene glycol, propylene glycol, diethylene glycol, trimethylene glycol, butanediol-1,3 and butanediol-2,3 and a dicarboxylic acid of a class consisting of maleic acid, fumaric acid and itaconic acid, and mixtures of said acids and an acid of a class consisting of phthalic acid, terephthalic acid, succinic acid, adipic acid, sebacic acid, and azelaic acid and which comprises heating a reaction mixture of said alcohol, said acids and an aromatic hydrocarbon which is relatively insoluble in water, which does not form ternary mixtures with water and said alcohol but which possess the property of forming with water vapors, volatile vapor mixtures which upon condensation, separate into an essentially aqueous fraction and an essentially nonaqueous fraction, the alcohol and the acids being in approximately stoichiometric ratio with respect to each other, the temperature of reaction being from about 230° F. to about 410° F. whereby to drive off vapors of aromatic hydrocarbon, water of reaction and said alcohol, passing the vapors into a lower portion of a vertically elongated vapor zone, washing the vapors in the top of the zone with a mixture of water and said aromatic hydrocarbon in approximately azeotropic ratio with respect to each other to maintain the top of the zone at about the boiling point of the azeotropic mixture of said hydrocarbon and water and withdrawing a mixture of vapors of said hydrocarbon and water from said top of the zone and condensing the latter mixture, the bottom portion of the zone being at a temperature to vaporize water tending to pass downwardly to the reaction mixture.

18. In a method of preparing a polyester from a mixture of (A) a dihydric alcohol which is volatile at esterification temperature and is of a class consisting of ethylene glycol, propylene glycol, diethylene glycol, trimethylene glycol, butanediol-1,3 and butanediol-2,3 and (B) a mixture of an alpha-beta ethylenically unsaturated dicarboxylic acid and an acid of the formula:

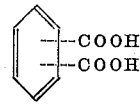

the steps of heating a reaction mixture of said alcohol and said acids of the temperature of esterification in a nonreactive, liquid medium which is insoluble in water, which does not form a ternary mixture with water and the dihydric alcohol, but being adapted to form an azeotropic mixture with water, thus to obtain a mixture of vapors of said medium, dihydric alcohol and water of reaction, passing the mixture of vapors into a lower portion of a vertically elongated zone, the top of which is at about the boiling point of the azeotropic mixture of said medium and water and the bottom of which is below the boiling point of the medium and above the boiling point of the azeotropic mixture, withdrawing a mixture of vapors substantially consisting of said medium and water, condensing the vapors, separating the medium and returning the same with added water to the top of the zone to wash the vapors in the top of the zone with the liquid mixture of water and said medium to maintain said temperature at the top of the zone, the addition of water and the medium being continued substantially to the end of the reaction, the bottom portion of the zone being at a temperature to vaporize water tending to pass downwardly to the reaction mixture.

References Cited in the file of this patent

UNITED STATES PATENTS

| | | |
|---|---|---|
| 1,425,624 | Backhaus | Aug. 15, 1922 |
| 2,249,768 | Kropa | July 22, 1941 |
| 2,279,764 | Smith et al. | Apr. 14, 1942 |
| 2,584,315 | Agnew | Feb. 5, 1952 |
| 2,668,848 | Neuworth | Feb. 9, 1954 |

FOREIGN PATENTS

| | | |
|---|---|---|
| 462,511 | Great Britain | Mar. 10, 1937 |
| 645,218 | Great Britain | Oct. 25, 1950 |

OTHER REFERENCES

Groggins: Unit Processes in Organic Synthesis, 4th ed., page 636, McGraw-Hill Book Co., Inc., New York, 1952. (Copy in Scientific Library.)